United States Patent [19]

Hakogi

[11] Patent Number: 5,263,102
[45] Date of Patent: Nov. 16, 1993

[54] POLARIZATION-INDEPENDENT OPTICAL SWITCHES/MODULATORS

[75] Inventor: Hironao Hakogi, Kawasaki, Japan
[73] Assignee: Fujitsu Limited, Kawasaki, Japan
[21] Appl. No.: 770,316
[22] Filed: Oct. 3, 1991

[30] Foreign Application Priority Data

Oct. 8, 1990 [JP] Japan .................. 2-268323

[51] Int. Cl.$^5$ .................. G02B 5/14
[52] U.S. Cl. .................. 385/2
[58] Field of Search .................. 385/2-4

[56] References Cited

U.S. PATENT DOCUMENTS

| | | | |
|---|---|---|---|
| 4,291,939 | 9/1981 | Giallorenzi et al. | 350/96 |
| 4,683,448 | 7/1987 | Duchet et al. | 385/2 |
| 4,871,223 | 10/1989 | Auracher et al. | 385/2 |
| 5,074,631 | 12/1991 | Hamano et al. | 385/3 |

FOREIGN PATENT DOCUMENTS 2406219  5/1979  France .

OTHER PUBLICATIONS

Conf. Proceedings LEOS 1990, vol. 2, Nov. 1990, p. 327; K. P. Nelson et al.: *Analysis of Electro-Optic Waveguide with Embedded Electrode Structures.*
Applied Optics, vol. 29, No. 1, Jan. 1990, New York, U.S., pp. 85-90; M. A. Title et al.: *Modeling and Characterization of Embedded Electrooptic Modulators.*

Primary Examiner—Akm E. Ullah
Attorney, Agent, or Firm—Staas & Halsey

[57] ABSTRACT

A polarization-independent optical switch/modulator provides a pair of waveguides having mutually parallel portions spaced apart a distance allowing directional coupling therebetween. A set of first electrodes of an embedded type are disposed in the waveguide substrate in the vicinity of both sides of the optical waveguides for controlling polarized light having the electric field component in the direction parallel to the surface of the waveguide substrate. Further, a set of second electrodes are disposed on the optical waveguides for controlling polarized light having the electric field component perpendicular to the surface of the waveguide substrate. The lengths of the first and second electrodes are set to have a predetermined ratio therebetween and the first and second electrodes are connected to a common power source.

6 Claims, 5 Drawing Sheets

POLARIZATION-INDEPENDENT OPTICAL SWITCHES/MODULATORS

BACKGROUND OF THE INVENTION

1. Field of the Invention

The present invention relates to polarization-independent optical switches/modulators and method for fabricating the same.

2. Description of the Prior Art

Optical switches used in the field of optical communications and optical transmission for switching optical paths are broadly divided into two categories of mechanical switches which switch optical paths by electro-mechanical movements of micro-optic elements and waveguide switches which switch optical paths in the substrates making use of the electrooptic effect or the like. Ones generally have some merits of low insertion loss and good crosstalk characteristics and relative insensitivity to wavelength or polarization. But they have a fatal defect that is not well suited to the construction of large and complex switch array, because they are slow in operation and physically bulky. While the others are potentially broad band, so waveguide switches and modulators are being extensively developed in these days.

Waveguide optical switches and optical modulators using as the substrate an electrooptic crystal having optical anisotropy such as $LiNbO_3$ have polarization-dependency, and therefore it is required to use only TM polarized light or TE polarized light, or to control both of TM polarized light and TE polarized light by applying a high driving voltage. Accordingly, there is a demand for optical switches and optical modulators being polarization-independent and capable of being driven with a low voltage.

Optical waveguide switches and modulators overcoming the difficulty of polarization-dependency by the use of optical waveguide switches and modulators with the substrate thereof formed of electrooptic crystal are disclosed in U.S. Pat. No. 4,291,939. The polarization-independent optical switch and modulator disclosed in the above patent are characterized by electrode configurations. Sets of electrodes for controlling TE polarized light are disposed on both sides of the optical waveguides and the other sets of electrodes for controlling TM polarized light are mounted on the waveguides. By applying independent voltages to each set of the electrodes, TE polarized light and TM polarized light are individually controlled, and thereby, polarization-independent optical switches and optical modulators are realized.

However, the optical waveguide switch and modulator disclosed in the above described U.S. patent have the electrodes for controlling TE polarized light and electrodes for controlling TM polarized light disposed on the same plane. Therefore, there are points of problem that the length of the portion of parallel optical waveguides is not effectively utilized and the driving circuit becomes complex. In the case of electrode configurations in which, to simplify the driving circuit, one set each of electrodes for controlling TE polarized light and electrodes for controlling TM polarized light are disposed, each set of the electrodes is disposed in different regions of the parallel optical waveguide portion. Therefore, the electrodes for controlling TE polarized light can not be formed especially longer, which results in a problem that a high driving voltage is required.

SUMMARY OF THE INVENTION

Accordingly, an object of the present invention is to provide a polarization-independent optical switches/modulators capable of simplifying the driving circuit and lowering the driving voltage by contriving the electrode configurations.

Another object of the present invention is to provide a method for fabricating the polarization-independent optical switches/modulators capable of simplifying the driving circuit and lowering the driving voltage.

In accordance with an aspect of the present invention, there is provided a polarization-independent optical switch/modulator comprising: a pair of optical waveguides formed on a waveguide substrate, the optical waveguides having mutually parallel portions spaced apart a distance allowing directional coupling therebetween; a set of first electrodes embedded in the waveguide substrate in the vicinity of both sides of the parallel portions of the optical waveguides for controlling polarized light having the electric field component in the direction parallel to the surface of the waveguide substrate; and a set of second electrodes mounted on the parallel portions of the optical waveguides for controlling polarized light having the electric field component in the direction perpendicular to the surface of the waveguide substrate.

Preferably, the lengths of the first electrode and the second electrode are set to have a predetermined ratio therebetween and the first and second electrodes are connected to a common power source.

According to the present invention, since the first electrodes for controlling polarized light having the electric field component in the direction parallel to the surface of the waveguide substrate are arranged in an embedded type, the first electrodes and the second electrodes can be formed virtually in the same region in the direction crossing over the waveguides. Therefore, effective electrode configurations with respect to the length of the parallel waveguide portions can be realized.

While the minimum voltage to extinguish the polarized light having the electric field component in the direction parallel to the substrate surface and the minimum voltage to extinguish the polarized light having the electric field component in the direction perpendicular to the substrate surface are different, by setting the lengths of the first electrodes and the second electrodes to have a predetermined ratio therebetween, it becomes possible to control both modes of polarized light simultaneously with a single voltage.

In accordance with another aspect of the present invention, there is provided a method for fabricating a polarization-independent optical switch/modulator comprising the steps of: forming grooves in a substrate made of an electrooptic material at both sides of portions where waveguides are to be formed; forming an $SiO_2$ layer on the interior of the grooves and on the substrate; forming an Si layer over the $SiO_2$ layer and filling up the grooves with Si; removing the Si layer and $SiO_2$ layer over the substrate to thereby expose the surface of the substrate; forming a Ti layer over the grooves and the portions where waveguides are to be formed; forming optical waveguides by thermal diffusion of the Ti layer and forming simultaneously Ti silicide within the grooves; removing residue of the Ti layer and then forming an SiO$_2$ buffer layer on the substrate; and forming electrodes on the optical waveguides with the SiO$_2$ buffer layer therebetween.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
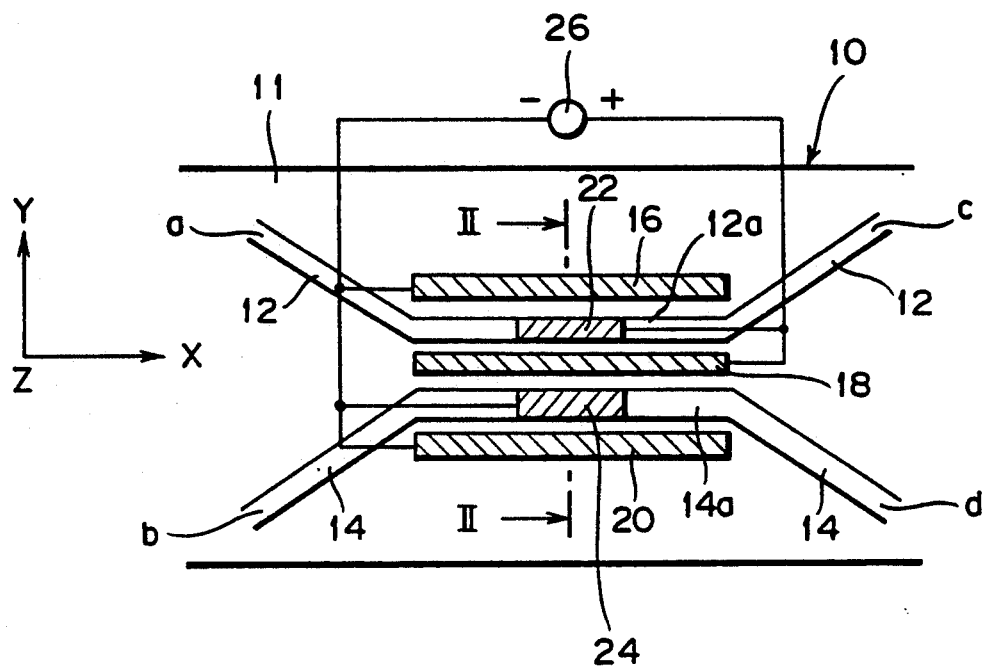
FIG. 1 is a plan view of an optical waveguide switch according to an embodiment of the present invention.
Figure 2:
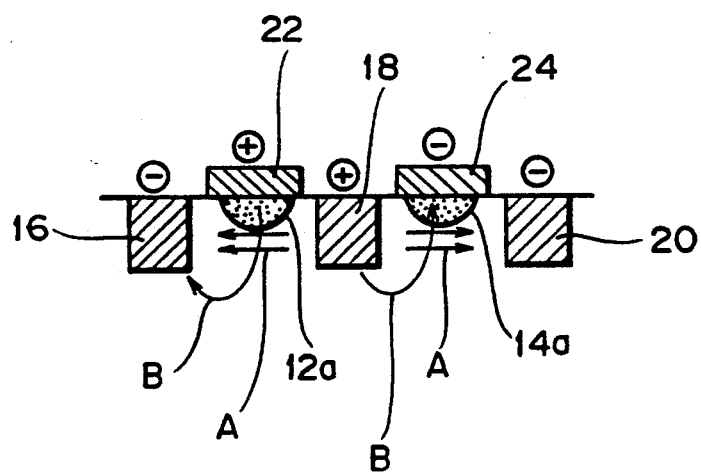
FIG. 2 is a sectional view taken along line II—II of FIG. 1.

FIG. 1 is a plan view of a directional coupler switch 10 according to the embodiment of the present invention. FIG. 2 shows a sectional view taken along line II—II of FIG. 1. Reference numeral 11 denotes a Z-cut LiNbO$_3$ substrate (hereinafter briefly referred to as "LN substrate") having the optic axis in the direction of Z-axis, and there are formed two waveguides 12 and 14 on the substrate 11. The waveguides 12 and 14 include very closely disposed parallel waveguide portions 12a and 14a, respectively. The waveguide 12 has an input port "a" and an output port "d", and the waveguide 14 has an input port "b" and an output port "d".

There are disposed embedded electrodes 16, 18, and 20 in parallel with the parallel waveguide portions 12a and 14a, with each of the parallel waveguide portions sandwiched between two of the electrodes, for controlling light having electric field vector in the direction parallel to the surface of the LN substrate 11 (TE polarized light). Further, on the parallel waveguide portions 12a and 14a, there are mounted electrodes 22 and 24, respectively, for controlling light having electric field vector in the direction perpendicular to the substrate surface (TM polarized light). The embedded electrodes 16, 18, and 20 for controlling TE polarized light and the electrodes 22 and 24 for controlling TM polarized light are connected to a common signal source 26. The embedded electrodes 16, 18, and 20 are formed, for example, of Ti silicide (chiefly TiSi$_2$, and secondarily Ti$_5$Si$_3$).

Figure 3:
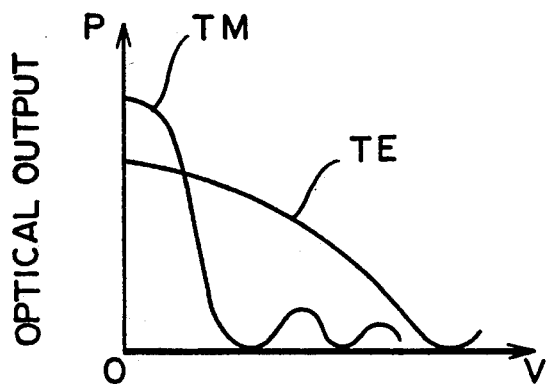
FIG. 3 is a graph showing the relationship of optical output to applied voltage.

The relationships between the optical outputs from a directional coupler switch for TM polarized light and TE polarized light to the voltages applied to the optical switch are shown in FIG. 3, from which it is known that the minimum voltage to extinguish TE polarized light is close to three times the minimum voltage extinguishing TM polarized light. Therefore, representing the ratio by N, by setting the length of the embedded electrodes 16, 18, and 20 for controlling TE polarized light approximately equal to the length of the parallel waveguide portions 12a and 14a and setting the length of the electrodes 22 and 24 for controlling TM polarized light to 1/N of that length, it becomes possible to drive the optical switch 10 for both TE polarized light and TM polarized light with the same voltage from the common signal source 26 applied to both sets of the controlling electrodes as shown in FIG. 1.

Referring to FIG. 2, when the embedded electrodes 16, 18, and 20 are applied with the voltages of indicated polarities, electric fields in the horizontal directions as indicated by arrows A are generated. Hence, TE polarized light having electric-field vector in the direction parallel to the substrate surface can be controlled by applying a suitable voltage to the embedded electrodes 16, 18, and 20. Meanwhile, between the electrode 22 mounted on the waveguide 12a and the embedded electrode 16 and between the electrode 24 mounted on the waveguide 14a and the embedded electrode 18, there are generated electric fields as indicated by arrows B, and these electric fields come to be virtually perpendicular to the waveguides at the parallel waveguide portions 12a and 14a. Hence, TM polarized light having electric-field vector in the direction perpendicular to the substrate surface can be controlled by applying a suitable voltage to the embedded electrodes 16, 18 and electrodes 22, 24.

Now, we assume that the parallel waveguide portions 12a and 14a are formed shorter than the complete coupling length for the propagating light of a predetermined wavelength. Then, signal light input to the input port "a" of the waveguide 12 having no voltage applied thereto is output from the output port "c" of the same waveguide 12 without coupling to the waveguide 14. If voltage is applied to the embedded electrodes 16, 18, and 20 and electrodes 22 and 24 from the signal source 26, the indexes of refraction of the parallel waveguide portions 12a and 14a change. With the indexes of refraction of these portions changed as described above, when the parallel waveguide portions 12a and 14a attain the complete coupling length for each polarized light, the signal light propagating through the waveguide 12 is completely coupled to the waveguide 14 at the parallel waveguide portion 14a and output from the output port "d". That is, an optical switching function is thus achieved. Likewise, by applying a suitable voltage to the embedded electrodes 16, 18, and 20 and electrodes 22 and 24, signal light input to the input port "b" of the optical waveguide 14 can be completely coupled to the optical waveguide 12 to be output from the output port "c".

Figure 4:
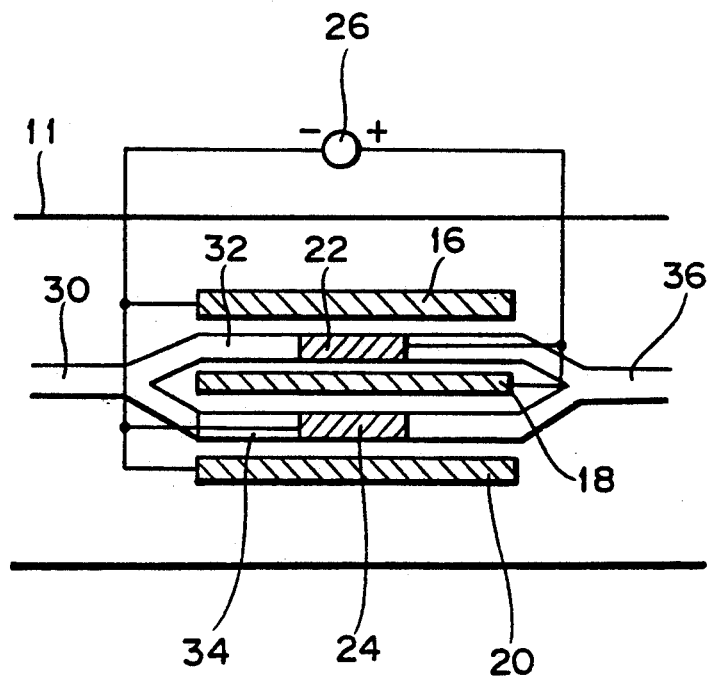
FIG. 4 is a plan view of an optical modulator according to another embodiment of the present invention.

Referring now to FIG. 4, there is shown a plan view of another embodiment of the present invention applied to a Mach-Zehnder optical modulator. In this embodiment, the component parts substantially the same as those in the embodiment shown in FIG. 1 are denoted by corresponding reference numerals and hence description of the same will be omitted.

The optical waveguide 30 is branched into parallel waveguides 32 and 34 through a Y-branch and the parallel waveguides are connected at their other ends to a single optical waveguide 36 through a similar Y-branch. The electrode configurations of the Mach-Zehnder optical modulator of the present embodiment are similar to the electrode configurations in the directional coupler type optical switch 10 shown in FIG. 1 and formed of embedded electrodes 16, 18, and 20 and mounted electrodes 22 and 24. The electrodes are each connected to a common signal source 26.

In the present embodiment, to operate it as an optical modulator, the phases of TE polarized light and TM polarized light are controlled by the applied voltage and input light is thereby modulated to be output to the single optical waveguide 36. Since the control of the TE polarized light and TM polarized light by the applied voltage is substantially the same as in the embodiment shown in FIG. 1, explanation of the same will be omitted.

Now, referring to FIG. 5, an example of the fabricating process of an optical switch according to the embodiment of the present invention will be described.

Figure 5A:
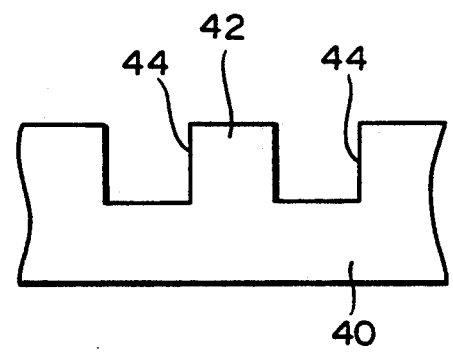
FIG. 5(a) to FIG. 5(h) are diagrams showing an example of fabrication process of an optical switch of the present invention.
Figure 5B:
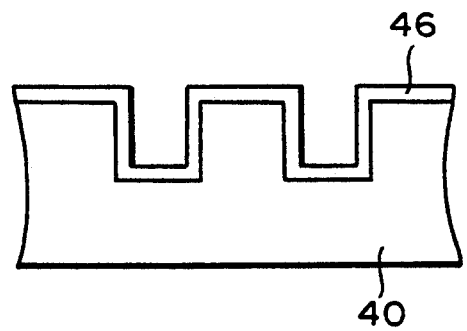
Figure 5C:
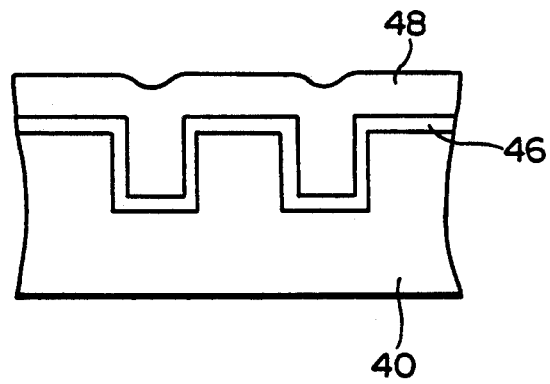
Figure 5D:
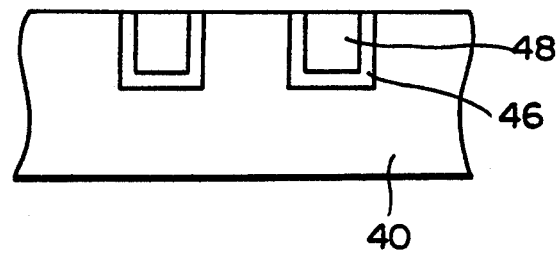
Figure 5E:
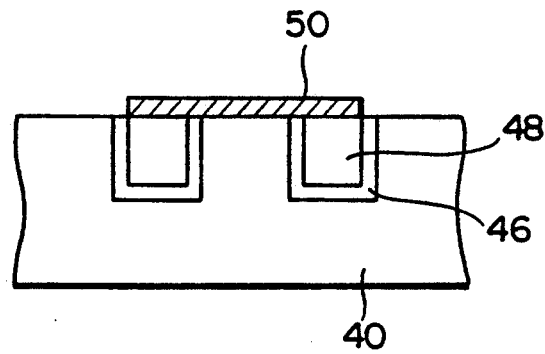

First, as shown in FIG. 5(a), grooves 44 are formed by etching or the like in a Z-cut LN substrate 40 on both sides of a portion 42 where a waveguide is to be formed. Next, as shown in FIG. 5(b), an SiO$_2$ layer 46 serving as buffer layer is formed on the interior of the grooves 44 and the substrate by evaporation, and then over the same, as shown in FIG. 5(c), an Si layer 48 is formed by evaporation and the interior of the grooves is filled up with Si. Next, as shown in FIG. 5(d), the Si layer 48 and the SiO$_2$ layer 46 over the LN substrate 40 are removed by grinding or etching, and then, as shown in FIG. 5(e), a Ti layer 50 is formed over the groove portions 44 and the portion 42 where a waveguide is to be formed by a lift-off method for example.

Figure 5F:
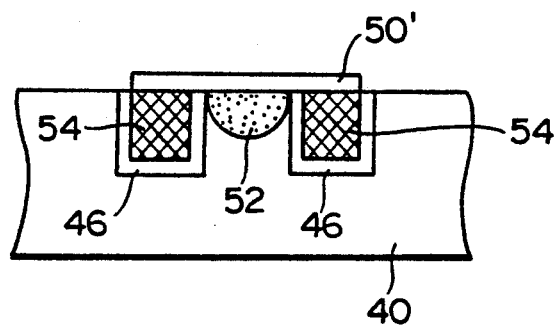
Figure 5G:
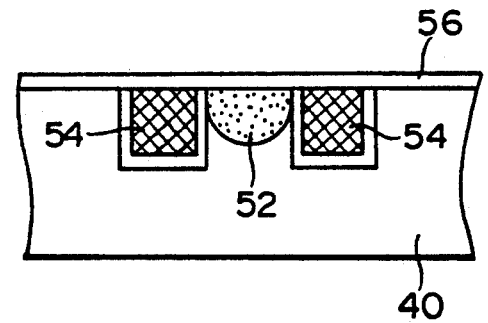
Figure 5H:
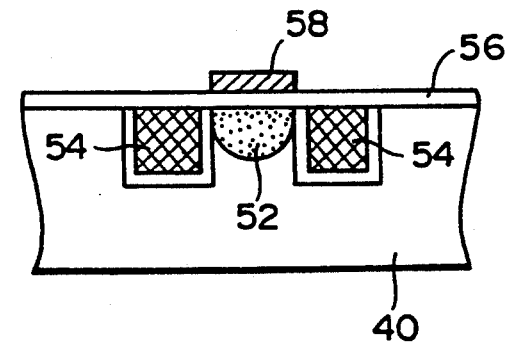

Next, as shown in FIG. 5(f), a waveguide 52 is formed by thermal diffusion of the Ti layer 50 and at the same time Ti silicide 54 is formed within the groove portions 44. After the residue 50' of the Ti layer has been removed, an SiO$_2$ layer 56 as buffer layer is formed by chemical vapor deposition on the substrate surface as shown in FIG. 5(g), and then an electrode 58 is formed over the waveguide 52 with the buffer layer therebetween as shown in FIG. 5(h).

In the foregoing description of the first and second embodiment, the described electrode configuration was that employing lumped electrodes. However, the present invention can of course be applied to optical switch and modulator having traveling-wave electrodes.

Figure 6:
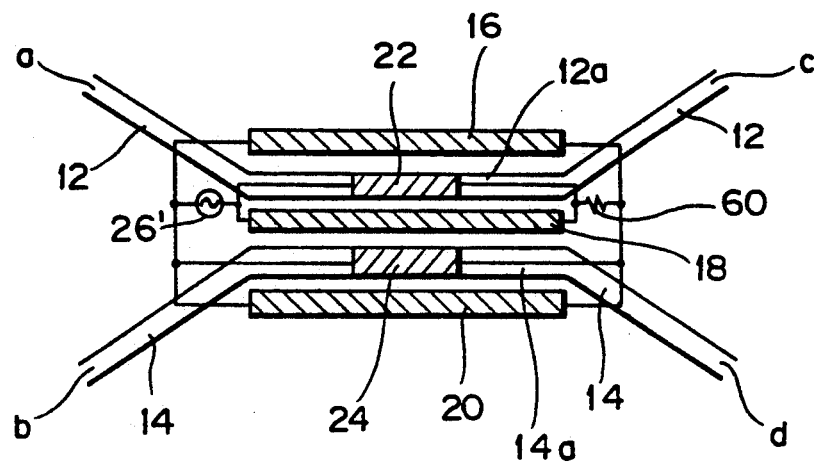
FIG. 6 is a plan view of an optical waveguide switch according to a further embodiment of the present invention.
Figure 7:
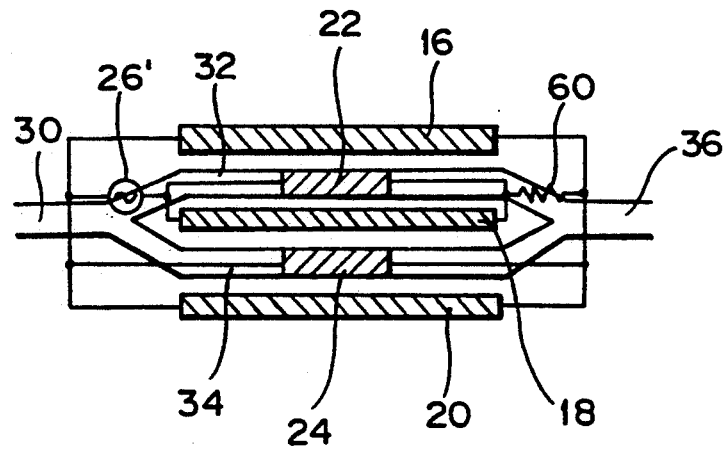
FIG. 7 is a plan view of an optical modulator according to a still further embodiment of the present invention.

An embodiment of an optical switch employing a traveling-wave electrode configuration is shown in FIG. 6 and an embodiment of an optical modulator employing a traveling-wave electrode configuration is shown in FIG. 7. In the embodiments shown in FIG. 6 and FIG. 7, component parts substantially the same as those in the embodiments shown in FIG. 1 and FIG. 4 are denoted by corresponding reference numerals and hence description of the same will be omitted.

The electrode configurations and interconnections of the electrodes of the optical switch having traveling-wave electrodes shown in FIG. 6 and the optical modulator having traveling-wave electrodes shown in FIG. 7 are the same. More specifically, one ends of the embedded electrodes 16 and 20 disposed outside the parallel waveguide portions 12a and 14a and one end of the electrode 24 are connected with one end of a microwave signal source 26'. The other ends of the embedded electrodes 16 and 20 and the other end of the electrode 24 are connected with one end of a terminal resistor 60. Meanwhile, one end of the embedded electrode 18 disposed between the parallel waveguide portions 12a and 14a and one end of the electrode 22 are connected with the other end of the microwave signal source 26' and the other end of the embedded electrode 18 and the other end of the electrode 22 are connected with the other end of the terminal resistor 60.

What is claimed is:

1. A polarization-independent optical switch/modulator comprising:
   a pair of optical waveguides formed in a substrate, said optical waveguides having mutually parallel portions spaced apart a distance allowing directional coupling therebetween;
   a set of first electrodes embedded entirely in said substrate in the vicinity of both sides of the parallel portions of said optical waveguides for controlling polarized light having an electric field component in a direction parallel to a surface of the substrate; and
   a set of second electrodes mounted on the parallel portions of said optical waveguides for controlling polarized light having the electric field component in the direction perpendicular to the surface of the substrate.

2. A polarization-independent optical switch/modulator according to claim 1,
   wherein said polarization-independent optical switch/modulator further comprises a common signal source to which said first and second electrodes are connected, and
   wherein said first and second electrodes have lengths set to have a predetermined ratio therebetween.

3. A polarization-independent optical switch/modulator according to claim 1, wherein said first electrode is formed of metallic silicide.

4. A polarization-independent optical switch/modulator comprising:
   a pair of optical waveguides formed in a substrate, said optical waveguides having mutually parallel portions spaced apart a distance allowing directional coupling therebetween;
   a set of first electrodes embedded in said substrate in the vicinity of both sides of the parallel portions of said optical waveguides for controlling polarized light having an electric field component in a direction parallel to a surface of the substrate; and
   a set of second electrodes mounted on the parallel portions of said optical waveguides for controlling polarized light having the electric field component in the direction perpendicular to the surface of the substrate,
   wherein said polarization-independent optical switch/modulator further comprises a common signal source to which said first and second electrodes are connected,
   wherein said first and second electrodes have lengths set to have a predetermined ratio therebetween,
   wherein said first electrode is formed of a first-first electrode, a second-first electrode and a third-first electrode, said second-first electrode being disposed between the parallel portions of said optical waveguides and the first-first and third-first electrodes being disposed outside the parallel portions,
   wherein said second electrode is formed of a first-second electrode and a second-second electrode both being disposed outside the parallel portions of said optical waveguides, and
   wherein the second-first and first-second electrodes are connected with a first end of said common signal source and the second-second electrodes is connected with a second end of said common signal source.

5. A polarization-independent optical switch/modulator, comprising:
   a pair of optical waveguides formed in a substrate, said optical waveguides having mutually parallel portions spaced apart a distance allowing directional coupling therebetween;
   a set of first electrodes embedded in said substrate in the vicinity of both sides of the parallel portions of said optical waveguides for controlling polarized light having an electric field component in a direction parallel to a surface of the substrate; and
   a set of second electrodes mounted on the parallel portions of said optical waveguides for controlling polarized light having the electric field component in the direction perpendicular to the surface of the substrate,
   wherein said polarization-independent optical switch/modulator further comprises a common signal source to which said first and second electrodes are connected,
   wherein said first and second electrodes have lengths set to have a predetermined ratio therebetween,
   wherein said polarization-independent optical switch/modulator further comprises a terminal resistor,
   wherein said first electrode is formed of a first-first electrode, a second-first electrode and a third-first electrode, said second-first electrode being disposed between the parallel portions of said optical waveguides and the first-first and third-first electrodes being disposed outside the parallel portions,
   wherein said second electrode is formed of a first-second electrode and a second-second electrode both being disposed outside the parallel portions of said optical waveguides, and
   wherein a first end of the first-first electrode, a first end of the third-first electrode and a first end of the second-second electrode are connected with a first end of said common signal source, a second end of the first-first electrode, a second end of the third-first electrode and a second end of the second-second electrode are connected with a first end of said terminal resistor, a first end of the second-first electrode and a first end of the first-second electrode are connected with a second end of said common signal source, and a second end of the second-first electrode and a second end of the first-second electrode are connected with a second end of said common signal source.

6. A method for fabricating a polarization-independent optical switch/modulator comprising the steps of:
   forming grooves in a substrate made of an electrooptic material at both sides of portions where waveguides are to be formed;
   forming an $SiO_2$ layer on the interior of said grooves and on said substrate;
   forming an Si layer over said $SiO_2$ layer and filling up the grooves with Si;
   removing the Si layer and $SiO_2$ layer over said substrate to thereby expose the surface of said substrate;
   forming a Ti layer over said grooves and said portions where waveguides are to be formed;
   forming optical waveguides by thermal diffusion of said Ti layer and forming simultaneously Ti silicide within said grooves;
   removing residue of said Ti layer and then forming an $SiO_2$ buffer layer on said substrate; and
   forming electrodes on said optical waveguides with said $SiO_2$ buffer layer therebetween.

* * * * *